United States Patent
Li et al.

(10) Patent No.: US 12,247,167 B2
(45) Date of Patent: Mar. 11, 2025

(54) SALT TOLERANT FRICTION REDUCER

(71) Applicant: ARAMCO SERVICES COMPANY, Houston, TX (US)

(72) Inventors: Wenwen Li, Pearland, TX (US); Rajesh Saini, Cypress, TX (US)

(73) Assignee: SAUDI ARABIAN OIL COMPANY, Dhahran (SA)

(*) Notice: Subject to any disclaimer, the term of this patent is extended or adjusted under 35 U.S.C. 154(b) by 214 days.

(21) Appl. No.: 17/644,450

(22) Filed: Dec. 15, 2021

(65) Prior Publication Data
US 2022/0220367 A1   Jul. 14, 2022

Related U.S. Application Data

(60) Provisional application No. 63/135,887, filed on Jan. 11, 2021.

(51) Int. Cl.
*C09K 8/90* (2006.01)
*C08F 220/06* (2006.01)
(Continued)

(52) U.S. Cl.
CPC ............ *C09K 8/905* (2013.01); *C08F 220/06* (2013.01); *C08F 220/282* (2020.02);
(Continued)

(58) Field of Classification Search
CPC ...... C09K 8/68; C09K 8/905; C09K 2208/28; C08F 220/06; C08F 220/56; C08F 220/282
See application file for complete search history.

(56) References Cited

U.S. PATENT DOCUMENTS

| | | |
|---|---|---|
| 4,400,496 A | 8/1983 | Butler et al. |
| 5,854,030 A | 12/1998 | Dordick et al. |

(Continued)

FOREIGN PATENT DOCUMENTS

| | | |
|---|---|---|
| CN | 103540309 B | 10/2015 |
| EP | 3556823 A1 | 10/2019 |

(Continued)

OTHER PUBLICATIONS

International Search Report and Written Opinion issued in corresponding PCT International Application No. PCT/JS2022/011970 dated Apr. 20, 2022 (71 pages).

(Continued)

*Primary Examiner* — Aiqun Li
(74) *Attorney, Agent, or Firm* — Osha Bergman Watanabe & Burton LLP

(57) ABSTRACT

Provided are water-soluble polymers that may include a water-soluble bipolymer, a water-soluble anionic terpolymer, and a water-soluble cationic terpolymer. The water-soluble polymers may include a reaction product of a first monomer that has a vinyl-containing group linked to a pendant carbohydrate moiety; a second monomer that has a vinyl group, a carbonyl group and a nitrogen; an anionic monomer in a water-soluble anionic terpolymer; and a cationic monomer in a water-soluble cationic terpolymer. Further provided are aqueous solutions that may include a water-soluble bipolymer, a water-soluble anionic terpolymer, and a water-soluble cationic terpolymer. Further provided are methods of use that may include introducing an aqueous solution into a formation such that the formation fractures, where the aqueous solution may include a water-soluble bipolymer, a water-soluble anionic terpolymer, and a water-soluble cationic terpolymer.

2 Claims, 4 Drawing Sheets

(51) Int. Cl.
*C08F 220/28* (2006.01)
*C08F 220/56* (2006.01)
*C09K 8/68* (2006.01)

(52) U.S. Cl.
CPC .............. *C08F 220/56* (2013.01); *C09K 8/68* (2013.01); *C09K 2208/28* (2013.01)

(56) References Cited

U.S. PATENT DOCUMENTS

| | | | |
|---|---|---|---|
| 7,232,793 | B1 | 6/2007 | King et al. |
| 7,846,878 | B2 | 12/2010 | Robb et al. |
| 8,871,512 | B2 | 10/2014 | Carlson et al. |
| 10,385,253 | B2 | 8/2019 | Frederick et al. |
| 2006/0035341 | A1* | 2/2006 | Boeckh .................. C07H 13/04 435/75 |
| 2012/0214714 | A1 | 8/2012 | Whitwell et al. |
| 2012/0264214 | A1* | 10/2012 | Carlson .................. A61L 27/18 521/149 |
| 2016/0186045 | A1 | 6/2016 | Maguire-Boyle et al. |
| 2016/0237336 | A1* | 8/2016 | Cortez .................. C09K 8/887 |
| 2017/0335162 | A1 | 11/2017 | Wang et al. |
| 2018/0155615 | A1 | 6/2018 | Rahy et al. |
| 2018/0244974 | A1 | 8/2018 | Sawant et al. |
| 2019/0062619 | A1* | 2/2019 | Li ........................... C09K 8/86 |
| 2019/0375983 | A1 | 12/2019 | Siddiqui et al. |
| 2020/0024497 | A1 | 1/2020 | Frederick et al. |

FOREIGN PATENT DOCUMENTS

| | | |
|---|---|---|
| KR | 101524729 B1 | 6/2015 |
| WO | 03085232 A1 | 10/2003 |
| WO | 2014146064 A2 | 9/2014 |
| WO | 2015/057183 A1 | 4/2015 |

OTHER PUBLICATIONS

Yang, Bo et al. "Review of friction reducers used in slickwater fracturing fluids for shale gas reservoirs" Journal of Natural Gas Science and Engineering 62 (2019) 302-313 (12 pages).

Habibpour, Mehdi et al. "Drag reduction behavior of hydrolyzed polyacrylamide/xanthan gum mixed polymer solutions" Pet. Sci., Springer DOI 10.1007/s12182-017-0152-7, Oct. 6, 2016 (12 pages).

Zhou, Jia et al. "Water-Based Environmentally Preferred Friction Reducer in Ultrahigh-JDS Produced Water for Slickwater Fracturing in Shale Reservoirs" SPE 167775 Copyright 2014, Society of Petroleum Engineers (13 pages).

Ibrahim, Ahmed F. et al. "A New Friction-Reducing Agent for Slickwater-Fracturing Treatments" 2018 SPE Production & Operations (13 pages).

Mann, Daniel et al. "Glucose-functionalized polystyrene particles designed for selective deposition of silver on the surface" RSC Adv., 2014, 4, 62878 (4 pages).

International Preliminary Report on Patentability issued in corresponding PCT International Application No. PCT/US2022/011970 dated Jul. 4, 2023 (7 pages).

Deshmukh et al., "Drag-Reduction Efficiency, Shear Stability, and Biodegradation Resistance of Carboxymethyl Cellulose-Based and Starch-Based Graft Copolymers," Journal of Applied Polymer Science, vol. 43, No. 6, Sep. 20, 1991, pp. 1091-1101, 7 pages.

* cited by examiner

SALT TOLERANT FRICTION REDUCER

BACKGROUND

Slickwater fracturing is a common technique in hydraulic fracturing of reservoirs related to hydrocarbon recovery. Methods of slickwater fracturing generally include pumping low viscosity aqueous fluid to fracture a formation downhole in a hydrocarbon reservoir. The aqueous fluid that is used further provides a medium to transport proppants from the surface into the hydrocarbon reservoir.

Generally, slickwater fracturing fluids are an aqueous-based fluid that may include polymer-based friction reducers, surfactants, biocides, breakers, and clay stabilizers. Slickwater fracturing fluids often have polymer-based friction reducers that provide friction loss reduction as the fluids flow through pipeline compared to fluids without such polymer-based friction reducers.

A common friction reducer used in slickwater fracturing fluid is a hydrolyzed polyacrylamide-based copolymer. These polyacrylamide-based copolymers may provide water solubility, thermal stability, and friction reduction performance when included in a fracturing solution.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a water-soluble bipolymer that may include a reaction product of a first monomer that has a vinyl-containing group linked to a pendant carbohydrate moiety, where the vinyl-containing group in the first monomer may be either an acryloyl group or a methacryloyl group; and a second monomer that has a vinyl group, a carbonyl group and a nitrogen.

In another aspect, embodiments disclosed are directed to an aqueous solution that may include a water-soluble bipolymer that is a reaction product of a first monomer that has a vinyl-containing group that is either an acryloyl group or a methacryloyl group linked to a pendant carbohydrate moiety, and a second monomer that has a vinyl group, a carbonyl group and a nitrogen, where the aqueous solution has a salinity in a range of from about 4,000 mg/L to about 57,000 mg/L total dissolved solids.

In another aspect, embodiments disclosed are directed to a method of use that may include introducing an aqueous solution into a formation such that the formation fractures, where the aqueous solution comprises a water-soluble bipolymer that is a reaction product of a first monomer that has a vinyl-containing group that is either an acryloyl group or a methacryloyl group linked to a pendant carbohydrate moiety, and a second monomer that has a vinyl group, a carbonyl group and a nitrogen, and where the aqueous solution has a salinity in a range of from about 4,000 mg/L to about 57,000 mg/L total dissolved solids.

In another aspect, embodiments disclosed are directed to a water-soluble anionic terpolymer that may include a reaction product of a first monomer that has a vinyl-containing group linked to a pendant carbohydrate moiety; a second monomer that has a vinyl group, a carbonyl group and a nitrogen; and an anionic monomer.

In another aspect, embodiments disclosed are directed to an aqueous solution that may include a water-soluble anionic terpolymer that is a reaction product of a first monomer that has a vinyl-containing group that is either an acryloyl group or a methacryloyl group linked to a pendant carbohydrate moiety, a second monomer that has a vinyl group, a carbonyl group and a nitrogen, and an anionic monomer, where the aqueous solution has a salinity in a range of from about 4,000 mg/L to about 57,000 mg/L total dissolved solids.

In another aspect, embodiments disclosed are directed to a method of use that may include introducing an aqueous solution into a formation such that the formation fractures, where the aqueous solution comprises a water-soluble anionic terpolymer that is a reaction product of a first monomer that has a vinyl-containing group that is either an acryloyl group or a methacryloyl group linked to a pendant carbohydrate moiety, a second monomer that has a vinyl group, a carbonyl group and a nitrogen, and an anionic monomer, and where the aqueous solution has a salinity in a range of from about 4,000 mg/L to about 57,000 mg/L total dissolved solids.

In another aspect, embodiments disclosed are directed to a water-soluble cationic terpolymer that may include a reaction product of a first monomer that has a vinyl-containing group linked to a pendant carbohydrate moiety; a second monomer that has a vinyl group, a carbonyl group and a nitrogen; and a cationic monomer.

In another aspect, embodiments disclosed are directed to an aqueous solution that may include a water-soluble cationic terpolymer that is a reaction product of a first monomer that has a vinyl-containing group that is either an acryloyl group or a methacryloyl group linked to a pendant carbohydrate moiety, a second monomer that has a vinyl group, a carbonyl group and a nitrogen, and a cationic monomer, where the aqueous solution has a salinity in a range of from about 4,000 mg/L to about 57,000 mg/L total dissolved solids.

In yet another aspect, embodiments disclosed are directed to a method of use that may include introducing an aqueous solution into a formation such that the formation fractures, where the aqueous solution comprises a water-soluble cationic terpolymer that is a reaction product of a first monomer that has a vinyl-containing group that is either an acryloyl group or a methacryloyl group linked to a pendant carbohydrate moiety, a second monomer that has a vinyl group, a carbonyl group and a nitrogen, and a cationic monomer, and where the aqueous solution has a salinity in a range of from about 4,000 mg/L to about 57,000 mg/L total dissolved solids.

Other aspects and advantages of this disclosure will be apparent from the following description made with reference to the accompanying drawings and the appended claims.

DETAILED DESCRIPTION

Figure 1:
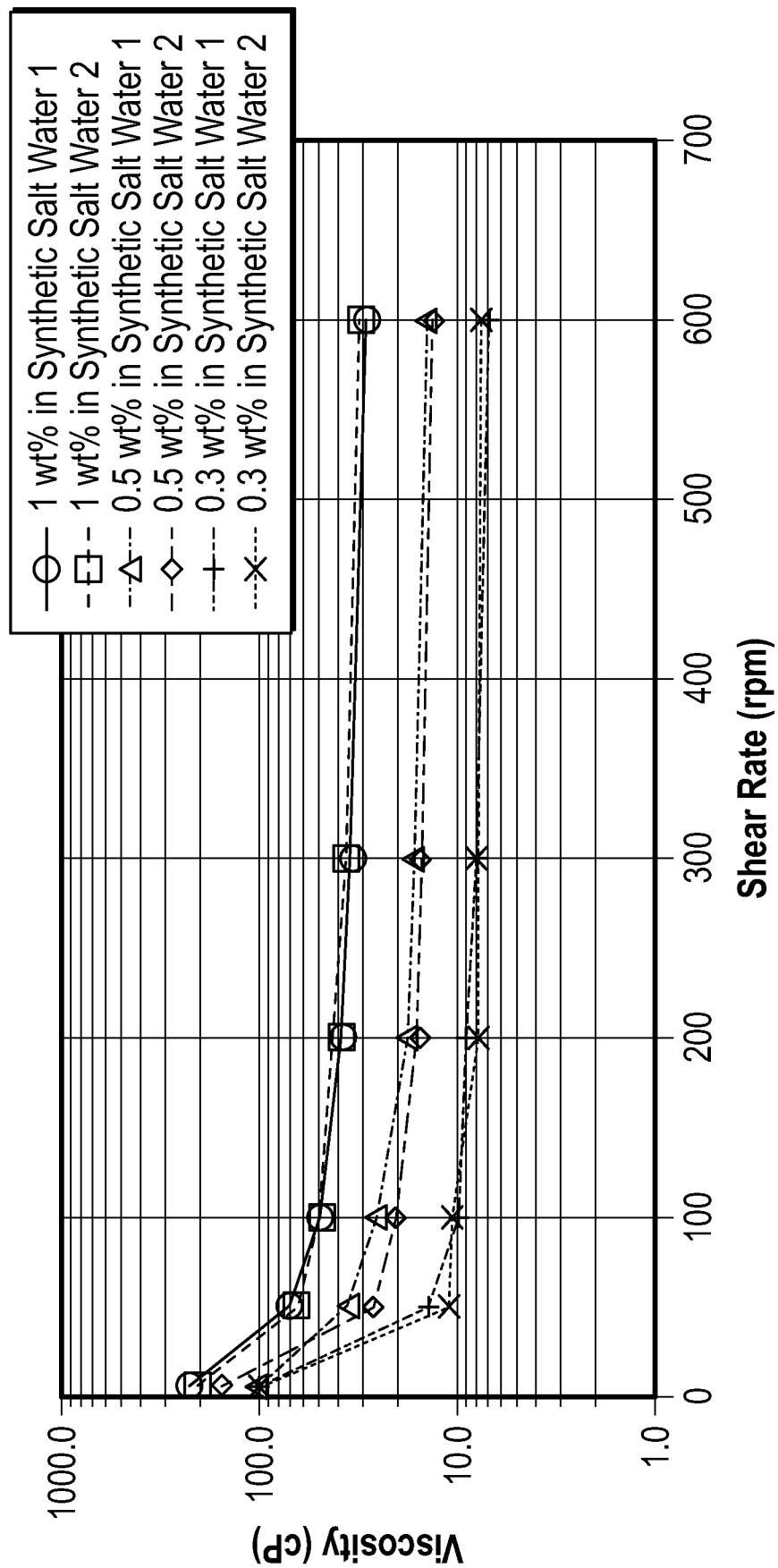
FIG. 1 shows a graph of viscosity versus shear rate for Example 1 in synthetic versions of natural salt water in accordance with one or more embodiments.

Traditional slickwater fracturing fluid in an unconventional reservoir may utilize around 5 to 15 million gallons of water. In some reservoir locations, obtaining the volume of water for slickwater fracturing from fresh or non-saline water sources may be challenging. For example, some reservoir locations may have limited access to fresh water sources, or those sources may be reserved for other uses, such as domestic consumption. As an alternative to dependence upon consumption of fresh water sources in slickwater fracturing, slickwater fracturing fluid can utilize sea water or produced water as a base fluid. However, both sea water and produced water contain greater levels of salts, including multivalent ions, compared to fresh water sources.

In accordance with one or more embodiments of the present disclosure, a slickwater fracturing fluid generally includes a mixture of water, friction reducer (friction reducing component), and proppant. The volume of water allows for a useful amount of proppant to be placed downhole while compensating for low viscosity of slickwater fracturing fluid.

Low viscosity may generally include viscosities of about 1 to 4 centipoise (cP). However, one of ordinary skill in the art would appreciate that other factors may alter viscosity, including but not limited to temperature and shear speed.

One or more embodiments of the present disclosure provide for friction reducers with enhanced salt tolerance, their method of manufacture, and their method of use. The enhanced salt tolerance permits friction reduction performance and maintenance of a desirable viscosity in high salinity fluids as compared to traditional friction reducers. One or more embodiments of the present disclosure further provide for slickwater fracturing fluids including friction reducers, and their method of use.

"Enhanced salt tolerance" is defined as an ability of a friction reducer to maintain a level of friction reduction performance and a desired viscosity in a brine solution or at least minimize the reduction in either the friction reduction performance or the viscosity. This is relative to traditional friction reducers that may suffer from decreased reduction in friction reduction performance, a reduced viscosity, or both, when introduced into a brine solution.

"High salinity" is in a range of from about 30,000 parts-per-million (ppm) total dissolved solids (TDS) to about 350,000 ppm TDS; "low salinity" is in a range of from greater than 0 ppm TDS to about 5,000 ppm TDS; "medium salinity" is in a range of from about 5,000 ppm TDS to about 30,000 ppm TDS.

In high salinity water, charge shielding of polymers may occur. Not wanting to be bound by any theory, charge shielding may arise from chemical interactions between ions in the water and surface charges on polymer chains. During charge shielding, the surface charges on the polymer are shielded from hydrogen bonding effects of the water, such as what may occur between polymers that support friction reduction in slickwater compositions and the water in the solution. As a result of charge shielding, the overall hydrogen bond donating and receiving ability of a polymer may decrease compared to a polymer that is not charge shielded. Hydrogen bond donor and acceptor sites on the charge shielded polymer may be blocked from interaction with other compounds or material in solution, such as proppant and common materials found within a wellbore fluid. Thus, the altered hydrogen bonding effects of a charge shielded polymer may alter its chemical properties, including chemical properties of the overall polymer and chemical properties at the surface of the polymer. Further, when a polymer is charge shielded it may alter its structure and physical configuration either alone or in situ, compared to a polymer that is not charge shielded. For example, a charge shielded polymer may curl, folding in upon itself. Therefore, polymers that are charge shielded may not provide friction reduction performance and viscosity as designed. The combined effect of altered chemical properties and structure and physical configuration of a charge shielded polymer may cause the polymer to precipitate, aggregate, salt-out, denature, lyse, or otherwise be rendered unsuitable for its intended use.

One or more embodiments of the present disclosure include compositions of friction reducers, slickwater fracturing fluids including friction reducers, synthesis of friction reducers and slickwater fracturing fluids including friction reducers, and method of use. In one or more embodiments, a method includes introducing slickwater fracturing fluid into a formation such that the formation fractures. In further embodiments, the slickwater fracturing fluid in the method has a salinity range of from about 4,000 mg/L to about 57,000 mg/L total dissolved solids.

The friction reducers may be included in the slickwater fracturing fluid, where the friction reducers are water-soluble polymers. The water-soluble polymers may be copolymers having one or more functional monomer with a pendant carbohydrate moiety linked to a vinyl-containing group of the monomer. In one or more embodiments, the term "monomer" used in the context of a copolymer means comonomer.

In one or more embodiments, a water-soluble polymer is provided that facilitates slickwater properties, that is, fluid flow friction reduction that is not susceptible to a charge shielding effect. One or more embodiments of the water-soluble polymer that facilitates slickwater properties may further provide a stable, predictable viscosity over a wide range of salt concentrations.

Among other things, proppant transport may generally be affected by a viscosity reduction of the slickwater fracturing fluid as compared to a slickwater fracturing fluid without a viscosity reduction. In one or more embodiments, a viscosity reduction of less than 5% of the slickwater fracturing fluid may not affect proppant transport as compared to a slickwater fracturing fluid without a viscosity reduction. In further embodiments, a viscosity reduction of less than 10% of the slickwater fracturing fluid may not affect proppant transport as compared to a slickwater fracturing fluid without a viscosity reduction.

The basic structure of the water-soluble polymers can be linear or branched. Molecular weights of the water-soluble polymers may be in a range of from about 500,000 to 25,000,000 grams per mole (g/mol). In one or more embodiments, the water-soluble polymers may be a water-soluble bipolymer or a water-soluble terpolymer.

In one or more embodiments, a functional monomer with a pendant carbohydrate moiety can be copolymerized with a second monomer to form a water-soluble bipolymer, which can be used as the friction reducer in slickwater fracturing fluid compositions. In other embodiments, the functional monomer with a pendant carbohydrate moiety can be copolymerized with a second monomer and a third anionic monomer to form a water-soluble anionic terpolymer, which can be used as the friction reducer in slickwater fracturing fluid compositions. In further embodiments, the functional monomer with a pendant carbohydrate moiety can be copolymerized with a second monomer and a third cationic monomer to form a water-soluble cationic terpolymer, which can be used as the friction reducer in slickwater fracturing fluid compositions.

Slickwater Fracturing Fluid

The base fluid of a slickwater fracturing fluid composition may be any form of water, including, but not limited to, deionized water; filtered or raw fresh waters; mineral waters; filtered, raw or synthetic seawater; brackish water; synthetic or natural brines; salt water; formation water; and produced water. The water may contain an amount of organics from natural or artificial sources as long as the function of the slickwater fracturing fluid, which is to provide friction reduction and a steady level of viscosity at various pumping rates, is not inhibited. The water may contain an amount of minerals or metals from natural or artificial sources as long as the function of the slickwater fracturing fluid is not inhibited. The water may contain an amount of monovalent ions, multivalent ions, and combinations thereof.

In one or more embodiments where total dissolved solids (TDS) testing may be used to determine salinity of the base fluid, TDS represents the salinity of the fluid without factoring in non-salt components. As a non-limiting example, total organic carbon (TOC) content of non-salt organics may not be factored into TDS concentrations of the base fluid.

In one or more embodiments, the performance of the friction reducer in a saline water is dependent on divalent and multivalent ion concentrations in addition to or independent of TDS. For example, a first solution of friction reducer in water with 4,000 ppm TDS containing 2,000 ppm of divalent ions can have a reduced viscosity compared to a second solution of the same friction reducer in water with a 4,000 ppm TDS without the 2,000 ppm of divalent and multivalent ions.

In one or more embodiments, the salinity of the slickwater fracturing fluid is not particularly limited as long as a steady viscosity is maintained while providing friction reduction. The salt concentration (salinity) can be from 0 to 350,000 ppm TDS. In such slickwater fracturing fluids, the concentration of $Ca^+$ ions may be upwards of 30,000 ppm; the concentration of $Mg^+$ ions may be upwards of 5,000 ppm; and the concentration of sulfate ions may be upwards of 4,000 ppm. The slickwater fracturing fluids may also have any concentration of other ions and minerals, including but not limited to $Na^+$, $K^+$, $Cl^-$, so long as the TDS remains at or under 350,000 ppm TDS.

As a non-limiting example, salinity of the slickwater fracturing fluid may be in a range of from about 1,000 milligrams per liter (mg/L) to about 350,000 mg/L total dissolved solids (TDS), such as from about 1,000 mg/L to about 100,000 mg/L TDS, and such as from about 4,000 mg/L to about 57,000 mg/L TDS.

In general, friction reduction can be affected by divalent ions and multivalent ions in the slickwater fracturing fluid more than by monovalent ions. In further embodiments, viscosity is affected by both monovalent ions and multivalent ions in the slickwater fracturing fluid, depending on the charge on the friction reducer.

Water Soluble Copolymer

In one or more embodiments, the slickwater fracturing fluid includes any one of the following: a water-soluble bipolymer, a water-soluble anionic terpolymer, and a water-soluble cationic terpolymer. In general, embodiments of water-soluble polymer are provided in a slickwater fracturing fluid composition commensurate with the respective water-soluble polymer. The application of the water-soluble bipolymer, water-soluble anionic terpolymer, or water-soluble cationic terpolymer, and the concentration of said water-soluble polymers in slickwater fracturing fluid composition, depends on the conditions of the reservoir, which may include the formation material, such as sandstone or carbonate.

First Monomer: Functional Monomer with a Pendant Carbohydrate Moiety

One or more functional monomer having a pendant carbohydrate moiety is included in one or more embodiments of water-soluble polymer. The functional monomer with a pendant carbohydrate moiety is a first monomer, where a second monomer and an optional third monomer may be included to form a polymer.

Examples of carbohydrate moieties to be used as a pendant on the (first) functional monomer are not particularly limited and may include modified monosaccharides, modified disaccharides, modified trisaccharides, and modified polysaccharides having cyclic and open structures, and combinations thereof.

Examples of carbohydrate moieties to be used as pendant on the (first) functional monomer that include modified polysaccharides further include oligosaccharides. Oligosaccharides can be former-larger polysaccharides that have been broken down into smaller components. The oligosaccharides then react with vinyl-containing or allyl-containing groups, for further reaction with other monomers. A polysaccharide may have different types of saccharides in one polymer chain, for example, a monosaccharide, disaccharide, or trisaccharide.

Generally, the inclusion of another monosaccharide or disaccharide, or monosaccharide and disaccharide in a polysaccharide allows the polymer to attain a non-symmetrical configuration. A known effect of a non-symmetrical polymer is that the polymer may not have propensity to crystallize and may further provide solubility in water compared to a symmetrical polymer.

An oligosaccharide is a saccharide polymer including saccharide units such as monosaccharide, disaccharide, trisaccharide, and others. In one or more embodiments, when an oligosaccharide is included, the number of saccharide units ranges from 2 to 100, for example, from 2 to 50, from 2 to 40, from 2 to 30, from 3 to 30, and from 3 to 10. Oligosaccharides can include broken polysaccharides, such as from guar gum, cellulose, hydrolyzed starch, amylose, amylopectin, chitin, pectins, xanthan, dextran gum, welan gum, gellan gum, fenugreek gum, and dextrins such as maltodextrin and cellodextrin. As a non-limiting example, broken guar gum can include mannose and galactose, which can be an oligosaccharide including two different kinds of monosaccharides. Oligosaccharides can be supplied, synthesized by attaching monosaccharides together, or otherwise provided by known methods.

Monosaccharide examples include, but are not limited to, allose, altrose, glucose, mannose, gulose, idose, galactose, talose, psicose, fructose, sorbose, and tagatose.

Disaccharide examples include, but are not limited to, sucrose (glucose-fructose), trehalose, lactose (galactose-glucose), maltose (glucose-glucose), cellobiose, and chitobiose.

Polysaccharide examples include, but are not limited to, alginate, chitosan, curdlan, dextran, derivatized dextran, emulsan, gellan, glucuronan, N-acetyl-heparosan, hyaluronic acid, kefiran, lentinan, levan, mauran, pullulan, scleroglucan, schizophyllan, stewartan, succinoglycan, xanthan, diutan, starch, tamarind, tragacanth, guar gum, gum ghatti, gum arabic, and cellulose. In one or more embodiments, the polysaccharides are broken into smaller components before use, for example, oligosaccharides.

Examples of a vinyl group, vinylic group, or vinyl-containing group in the functional monomer linked to a pendant carbohydrate moiety include an acryloyl group and a methacryloyl group. Variants of acryloyl groups that are linked to the pendant carbohydrate moiety are shown in Formula IA, and variants of methacryloyl groups that are linked to the pendant carbohydrate moiety are shown in Formula IB:

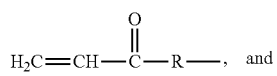  (Formula IA)

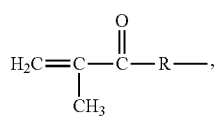  (Formula IB)

where R'=O, N, or NH, where R is linked to $R_{carb}$, and where $R_{carb}$=pendant carbohydrate moiety. The vinyl group, vinylic group, or vinyl-containing group in the functional monomer with a pendant carbohydrate moiety may further have a vinyl ether structure as shown in Formula II:

  (Formula II)

where R'=O, where R' is linked to Rib, and where $R_{carb}$=pendant carbohydrate moiety.

In one or more embodiments, functional monomers comprising Formula IA, Formula IB, and Formula II are not particularly limited. For example, functional monomers containing Formulas IA, IB, and II can be added independently onto a copolymer and in other embodiments they can be used in combination, such as to copolymerize with a second monomer or a second and a third monomer.

Without wanting to be bound by any theory, a monomer containing Formulas IA and IB may be reactive in free radical polymerization with other water-soluble acrylic monomers, such as acrylamide and acrylic acid. When monomers containing Formula IA, IB, or IA and IB are copolymerized with other water-soluble acrylic monomers, a random copolymer may form. Meanwhile, a monomer containing Formula II may have a lower reactivity than a monomer containing Formulas IA, IB, and other water-soluble acrylic monomers. When a monomer containing Formula II is included in the monomer mixture with Formulas IA, IB, or other water-soluble acrylic monomers, the monomer containing Formula II may not randomly insert into the acrylic monomers, and as a result a block copolymer structure may form. In one or more embodiments, the functional monomer containing pendant carbohydrate moiety may be in a range of from about 0.05 weight % (wt %) to about 50 wt %, such as 0.1 wt % to 30 wt %, and such as 0.5 wt % to 20 wt %, of the water-soluble polymer, for example, the water-soluble bipolymer, the water-soluble anionic terpolymer, and the water-soluble cationic terpolymer.

In one or more embodiments, the functional monomer with a pendant carbohydrate moiety is a modified glucose, for example, 6-O-acryloyl-D-glucose.

Second Monomer: Acrylamide or Organic Nitrogen-Containing Group Having a Carbonyl Group with a Vinyl Attachment Moiety Monomer In one or more embodiments, a functional monomer containing a pendant carbohydrate moiety and a second monomer are copolymerized to form a water-soluble bipolymer.

In one or more embodiments, a water-soluble bipolymer comprises the reaction product of a monomer that has a vinyl-containing group linked to a pendant carbohydrate moiety and a second monomer.

In one or more embodiments, the second monomer in a water-soluble polymer may be either acrylamide or another organic nitrogen-containing group having a carbonyl group along with a vinyl attachment moiety.

In some instances, the second monomer may be selected from acrylamide, N,N-dimethylacrylamide, (meth)acrylamide, N-alkyl(meth)acrylamide (where alkyl is $C_1$-$C_3$), dimethyl(meth)acrylamide, 4-acryloylmorpholine, N-vinylpyrrolidone, N-vinylformamide, N-vinylacetamide, and combinations thereof.

In one or more embodiments, the second monomer has a weight percentage in the range of from about 50 wt % to about 99.95 wt %, such as 70 wt % to 99.9 wt %, and such as 80 wt % to 99.5 wt %, of the water-soluble polymer, where the water-soluble polymer may be, for example, a bipolymer or a terpolymer.

Third Monomer: Optional Monomer

In one or more embodiments, a functional monomer containing a pendant carbohydrate moiety and a second monomer may further copolymerize with a third monomer to form a water-soluble polymer. This third monomer is optional and allows the formation of a water-soluble terpolymer.

In one or more embodiments, a water-soluble terpolymer comprises the reaction product of a first monomer, a second monomer, and a third monomer.

The third monomer may be an anionic monomer or a cationic monomer. When the third monomer is an anionic monomer, polymerization results in a water-soluble anionic terpolymer. When the third monomer is a cationic monomer, polymerization results in a water-soluble cationic terpolymer.

Anionic (Third, Optional) Monomer

In one or more embodiments, the anionic monomer is a third optional monomer in a copolymer that is used to form a water-soluble anionic terpolymer.

In one or more embodiments, a water-soluble anionic terpolymer comprises the reaction product of a first monomer, a second monomer, and an anionic monomer.

The anionic monomer is not particularly limited as long as it carries an overall anionic charge. The anionic monomer may include, but is not limited to, acrylic acid, (meth)acrylic acid, 2-acrylamido-2-methylpropane sulfonic acid (AMPS), styrenesulfonic acid, vinylphosphoric acid, maleic acid, itaconic acid, their corresponding salts, and combinations thereof. The anionic monomer may further include acrylates and sulfonates.

Both the acid form and the corresponding salt form of the anionic monomer, or either the acid form or the corresponding salt form of the anionic monomer, may be provided as a starting reagent, where polymerization thereof is conducted at around neutral pH (such as a pH of from about 6 to about 8). Under polymerization at around neutral pH, the acid form of the starting reagent will be in salt form, where the salt form in this instance is the anionic monomer.

In one or more embodiments, the optional anionic monomer has a weight percentage in a range of from greater than 0 wt % to about 30 wt %, such as greater than 0 wt % to 20 wt %, and such as greater than 0 wt % to 15 wt %, of the water-soluble anionic terpolymer.

Cationic (Third, Optional) Monomer

In one or more embodiments, the cationic monomer is another third optional monomer in a polymer that is used to form a water-soluble cationic terpolymer.

In one or more embodiments, a water-soluble cationic terpolymer comprises the reaction product of a first monomer, a second monomer, and a cationic monomer.

The cationic monomer may have one or both a quaternary ammonium salt and a nitrogenous base compound along with a vinyl attachment moiety. When a quaternary ammonium salt or nitrogenous base compound is used as a cationic monomer, the polymerization is conducted at around neutral pH (6 to 8). Under polymerization at around neutral pH, the nitrogenous base compound of the starting reagent will be in salt form, where the salt form in this instance is the cationic monomer.

Examples of the cationic monomer include, but are not limited to, (meth)acrylamidopropyltrimethyl ammonium halides; (meth)acrylamidoethyltrimethyl ammonium halides; (meth)acryloyloxyethyltrimethyl ammonium halides; (meth)acryloyloxyethyltrimethyl ammonium methyl sulfate; dimethylaminoethylmethacrylate; dimethyldiallylammonium halides, such as dimethyldiallylammonium chloride; and dimethylaminopropylmethacrylamide. (3-acrylamidopropyl)trimethylammonium chloride may be used as a cationic monomer in one or more embodiments of the water-soluble cationic terpolymer.

In one or more embodiments, the optional cationic monomer has a weight percentage in the range of from greater than 0 wt % to about 30 wt %, such as 0 wt % to 20 wt %, and such as 0 wt % to 15 wt %, of the water-soluble cationic terpolymer.

Water-Soluble Polymer Synthetic Procedures

In one or more embodiments, the synthesis of the water-soluble bipolymer, water-soluble anionic terpolymer, and water-soluble cationic terpolymer includes the use of the various monomers as previously described. A bipolymer is comprised of two different monomers; a terpolymer is comprised of three different monomers. Distinction between an anionic terpolymer and a cationic terpolymer is made by way of the third (anionic or cationic) monomer that is included in the polymer synthesis.

Procedure for Synthesis of Water-Soluble Bipolymer

A procedure to form a water-soluble bipolymer from glucose acrylate monomer (functional monomer with a pendant carbohydrate moiety) and acrylamide (second monomer) is described in steps 1-8 as follows.

Step 1: Preparation of aqueous phase. Acrylamide and glucose acrylate monomer are mixed with DI (deionized) water in a beaker until a homogeneous solution is formed.

Step 2: Generation of water-in-oil (W/O) emulsion. First, oil phase solvent and sorbitan monoester and polysorbate (emulsifier) are introduced into a glass reaction kettle equipped with a thermocouple, a nitrogen inlet and outlet, a mechanical stirring rod, and are mixed until a homogeneous solution is formed. Then, the aqueous solution prepared in step 1 is added to the glass reaction kettle under overhead agitation to form a dispersion of the aqueous phase in the continuous oil phase.

Step 3: Sparging. The resulting dispersion is sparged with nitrogen under agitation.

Step 4: Initiation. Tert-butyl hydroperoxide (70% solution in water) is added to the reactor followed by slow addition of sodium metabisulfite (SMBS) solution.

Step 5: Polymerization. A polymerization temperature is maintained between 38° C. and 42° C. for approximately 90 minutes (min.) as the emulsion polymerization is carried out under nitrogen.

Step 6: Residual monomers are reacted by introducing additional SMBS solution, and then the reactor is allowed to cool to room temperature over a time of 30 min.

Step 7: Packaging. After cooling the reactor to room temperature, the final product is discharged and stored for further analysis.

Step 8: Purification. Tractable solid samples of water-soluble bipolymer are obtained by precipitation using acetone. The samples are then dried.

Procedure for Synthesis of Water-Soluble Anionic Terpolymer

A procedure to form a water-soluble terpolymer from glucose acrylate monomer (functional monomer with a pendant carbohydrate moiety), acrylamide (second monomer), and acrylic acid (anionic, third monomer) is described in steps 1-8 as follows.

Step 1: Preparation of aqueous phase. 150 grams (g) of acrylamide, 15 g of acrylic acid, and 3 g of glucose acrylate monomer are mixed with 162 g of deionized (DI) water in a beaker until a homogeneous solution is formed. The pH is adjusted to about 7 using a sodium hydroxide solution.

Step 2: Generation of water-in-oil (W/O) emulsion. First, 100 g oil phase solvent trade name "LPA-210" (supplied by SASOL) and 15 g sorbitan monoester and polysorbate (emulsifier) are introduced into a glass reaction kettle equipped with a thermocouple, a nitrogen inlet and outlet, a mechanical stirring rod, and are mixed until a homogeneous solution is formed. Then, the aqueous solution prepared in step 1 is added to the glass reaction kettle under overhead agitation to form a dispersion of the aqueous phase in the continuous oil phase.

Step 3: Sparging. The resulting dispersion is sparged with nitrogen under agitation.

Step 4: Initiation. 62.5 microliters (μL) of tert-butyl hydroperoxide (70% solution in water) is added to the reactor, followed by slow addition of sodium metabisulfite (SMBS) solution (109 milligrams (mg) of SMBS dissolved in 7.5 mL of water).

Step 5: Polymerization. A polymerization temperature is maintained between 38° C. and 42° C. for approximately 90 min as the emulsion polymerization is carried out under nitrogen.

Step 6: Residual monomers are reacted by introduction of additional SMBS solution, and then the reactor is allowed to cool to room temperature over a time of 30 min.

Step 7: Packaging. After cooling the reactor to room temperature, the final product is discharged and stored for further analysis.

Step 8: Purification. Tractable solid samples of water-soluble anionic terpolymer from the procedure found in Example 1 are obtained by precipitation using acetone. The samples are then dried. Aliquots of the samples are then obtained for analytical evaluation, including viscosity and friction reduction performance tests.

Procedure for Synthesis of Water-Soluble Cationic Terpolymer

A procedure to form a water-soluble cationic terpolymer from glucose acrylate monomer (functional monomer with a pendant carbohydrate moiety), acrylamide (second monomer), and (3-acrylamidopropyl)trimethyl-ammonium halide (cationic, third monomer) is described in steps 1-8 as follows.

Step 1: Preparation of aqueous phase. Acrylamide, (3-acrylamidopropyl)trimethyl-ammonium halide and glucose acrylate monomer are mixed with DI water in a beaker until a homogeneous solution is formed.

Step 2: Generation of water-in-oil (W/O) emulsion. First, oil phase solvent and sorbitan monoester and polysorbate (emulsifier) are introduced into a glass reaction kettle equipped with a thermocouple, a nitrogen inlet and outlet, a mechanical stirring rod, and mixed until a homogeneous solution is formed. Then, the aqueous solution prepared in step 1 is added to the glass reaction kettle under overhead agitation to form a dispersion of the aqueous phase in the continuous oil phase.

Step 3: Sparging. The resulting dispersion is sparged with nitrogen under agitation.

Step 4: Initiation. Tert-butyl hydroperoxide (70% solution in water) is added to the reactor followed by slow addition of sodium metabisulfite (SMBS) solution.

Step 5: Polymerization. A polymerization temperature is maintained between 38° C. and 42° C. for approximately 90 minutes (min.) as the emulsion polymerization is carried out under nitrogen.

Step 6: Residual monomers are reacted by introduction of additional SMBS solution, and then the reactor is allowed to cool to room temperature over a time of 30 min.

Step 7: Packaging. After cooling the reactor to room temperature, the final product is discharged and stored for further analysis.

Step 8: Purification. Tractable solid samples of water-soluble cationic terpolymer from the procedure are obtained by precipitation using acetone. The samples are then dried.

EXAMPLES

Example 1

Example 1 provides a water-soluble anionic terpolymer prepared from glucose acrylate monomer (functional monomer with a pendant carbohydrate moiety), acrylamide (second monomer), and acrylic acid (anionic, third monomer). The polymer of Example 1 was prepared using the method described in "Procedure for Synthesis of Water-Soluble Anionic Terpolymer."

The glucose acrylate monomer used in Example 1 was 6-O-acryloyl-D-glucose, synthesized according to the procedure listed in Mann, D. et al., *Glucose-functionalized polystyrene particles designed for selective deposition of silver on the surface*, 4 RSC Advances 62878 (2014), and is pictured in Formula III:

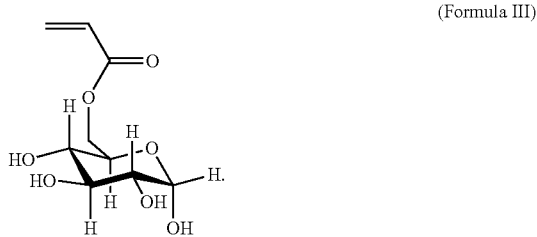

(Formula III)

Comparative Example 1

Comparative Example 1 (CE1) provides a water-soluble terpolymer of acrylamide (second monomer), acrylic acid (anionic, third monomer), and hexyl acrylate (a monomer without a pendant carbohydrate moiety).

Acrylamide, acrylic acid, and hexyl acrylate were used to prepare the polymer using the method described in "Procedure for Synthesis of Water-Soluble Anionic Terpolymer" (adapted for the terpolymer of Comparative Example 1). The molar ratio of acrylamide, acrylic acid, and hexyl acrylate was set at 89.25/8.9/0.75. 3 weight percent (wt %) of secondary alcohol ethoxylate inverting surfactant was added to the emulsion after polymerization. The final product was discharged and stored for further viscosity and friction reduction analysis in emulsion form.

Comparative Example 2

Comparative Example 2 (CE2) provides a water-soluble bipolymer of acrylamide (second monomer) and 2-acrylamido-2-methylpropane sulfonic acid ("AMPS") (anionic monomer).

Acrylamide and AMPS monomer were used to prepare the polymer using the method described in "Procedure for Synthesis of Water-Soluble Anionic Terpolymer" (adapted for the bipolymer of Comparative Example 2). The molar ratio of acrylamide and AMPS was set at 90/10. 3 weight percent (wt %) of a secondary alcohol ethoxylate-based nonionic surfactant, inverting surfactant, was added to the emulsion after polymerization. The final product was collected and stored for further viscosity and friction reduction analysis in emulsion form.

Preparation of Synthetic Salt Water 1

1.31 grams (g) of NaCl, 1.11 g of $CaCl_2$, 0.48 g of $MgCl_2$, 0.89 g of $Na_2SO_4$ and 0.19 g of $NaHCO_3$ were dissolved in 1.0 liter (L) of deionized (DI) water. The resultant solution was used for viscosity and friction reduction evaluation. The total dissolved solids (TDS) in Synthetic Salt Water 1 was around 4,000 mg/L.

Preparation of Synthetic Salt Water 2

38.55 g of NaCl, 2.3 g of $CaCl_2 \cdot 2H_2O$, 7.83 g of $MgCl_2$, 6.06 g of $Na_2SO_4$ and 0.26 g of $NaHCO_3$ were dissolved in 1.0 L of DI water. The resultant solution was used for viscosity and friction reduction evaluation. The TDS in Synthetic Salt Water 2 was around 57,000 mg/L.

Viscosity Measurement

Aqueous solutions of the Example 1 anionic terpolymer, having concentrations of 1.0, 0.5, 0.3, 0.2, and 0.1 weight percent (wt %), were prepared by dispersing the corresponding amount of Example 1 (polymer) into either Synthetic Salt Water 1 and Synthetic Salt Water 2, respectively. For example, 2 g of Example 1 (polymer) was dispersed in 198 g of synthetic salt water to form a polymer solution with concentration of 1 wt %.

Aqueous solutions of Comparative Example 1 and Comparative Example 2 polymers with concentration of 5 gallons per thousand gallons (gpt) were prepared by dispersing 1.0 milliliter (mL) of emulsion sample having 3 wt % inverting surfactant into 200 mL of Synthetic Salt Water 1 and Synthetic Salt Water 2, respectively.

The viscosity of the solutions were measured using a Model 35 FANN® Viscometer at sheer rates of 6, 50, 100, 200, 300, and 600 revolutions per minute (rpm). The Model 35 FANN® Viscometer was equipped with a factory installed R1 rotor sleeve, F1 torsion spring, and a stainless steel sample cup for testing. Viscosity measurements were taken in accordance to American Petroleum Institute (API) Specification RP 13B.

Friction Reduction Performance Evaluation

The friction reduction performance of the Examples and Comparative Examples were tested using a Model 6500-M Mini-Loop™ from Chandler Engineering® (Ametek®). The flow rate was set at 4 gallons per minute (GPM). In the friction flow loop, the flow rate generally remained at 4 to 10 GPM depending on the flow loop. The injection pressure was set to about 35 pounds per square inch (psi). Tubing diameter having a ⅜" outer diameter (OD) and a 0.28" inner diameter (ID) was used. Synthetic Salt Water 2 was used as the base fluid. In a typical experiment, a first water friction was measured and then a water friction with friction reducer was measured, at 0.25 to 2.0 gpt loadings. From values taken at the first water friction measurement and the water friction with friction reducer measurement, the percent friction reduction was calculated.

Viscosity Data

Viscosity data of the water-soluble anionic terpolymer friction reducers obtained from Example 1 under various testing conditions are summarized in Table 1A, Table 1B, and FIG. 1. FIG. 1 shows a graph of viscosity versus shear rate for Example 1 in synthetic versions of natural salt water in accordance with one or more embodiments. As shown in FIG. 1, when at the same terpolymer loading level, the solution viscosity was comparable when the base fluid was changed from Synthetic Salt Water 1, which has a lower salt concentration (TDS ~4,000 milligrams per liter (mg/L)), to Synthetic Salt Water 2, which has a higher salt concentration (TDS ~57,000 mg/L). For instance, at 0.3 wt % terpolymer loading the solution viscosity was measured as 8.3 centipoise (cP) in Synthetic Salt Water 1 and 8.0 cP in Synthetic Salt Water 2, respectively, at a shear rate corresponding to a spindle or rotor speed of 300 rpm. At 0.2 wt % terpolymer loading, the solution viscosity was measured at 5.3 cP in Synthetic Salt Water 1 and 5.5 cP Synthetic Salt Water 2 at 300 rpm. In Example 1, the solution viscosity at 0.2 wt % terpolymer loading and 300 rpm shear rate was increased from 5.3 cP in Synthetic Salt Water 1 (Table 1A) to 5.5 cP in Synthetic Salt Water 2 (Table 1B). In Example 1 at 300 rpm and 0.2 wt % loading, the viscosity exhibits no decrease in high salinity Synthetic Salt Water 2 versus in low salinity Synthetic Salt Water 1. The well-maintained viscosity data at various salinity concentrations indicates that the water-soluble anionic terpolymer of Example 1 is salt tolerant. For example, the viscosity reduction is absent (or exhibits a viscosity increase of less than 5%) at 300 rpm with the base fluid changed from low salinity Synthetic Salt Water 1 to high salinity Synthetic Salt Water 2 when the glucose acrylate monomer of Example 1 is included (see Example 1). The introduction of a functional monomer with a pendant carbohydrate moiety shows a well-maintained viscosity when salinity increases.

Figure 2A:
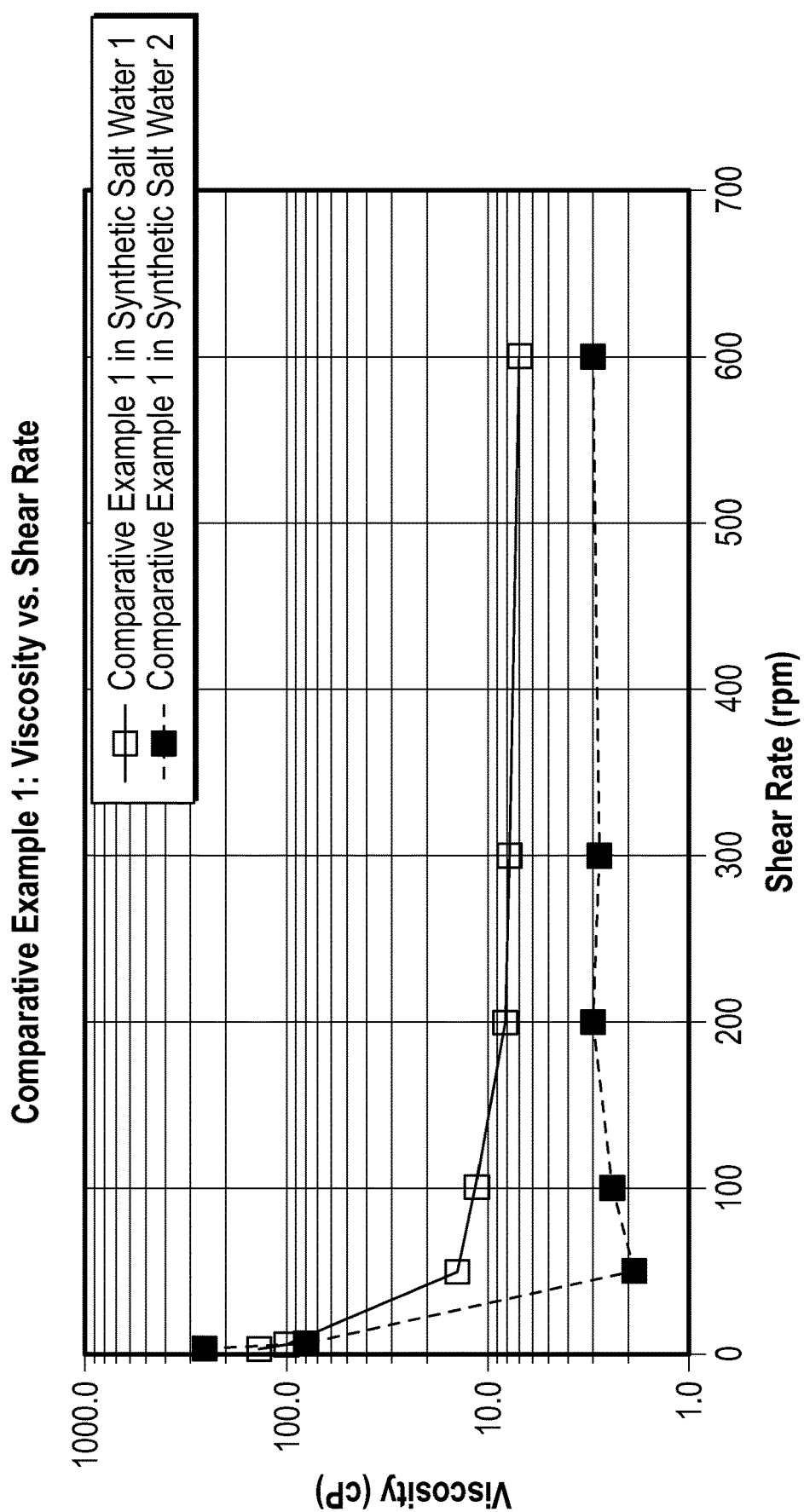
FIG. 2A shows a graph of viscosity versus shear rate for Comparative Example 1 in synthetic versions of natural salt water.
Figure 2B:
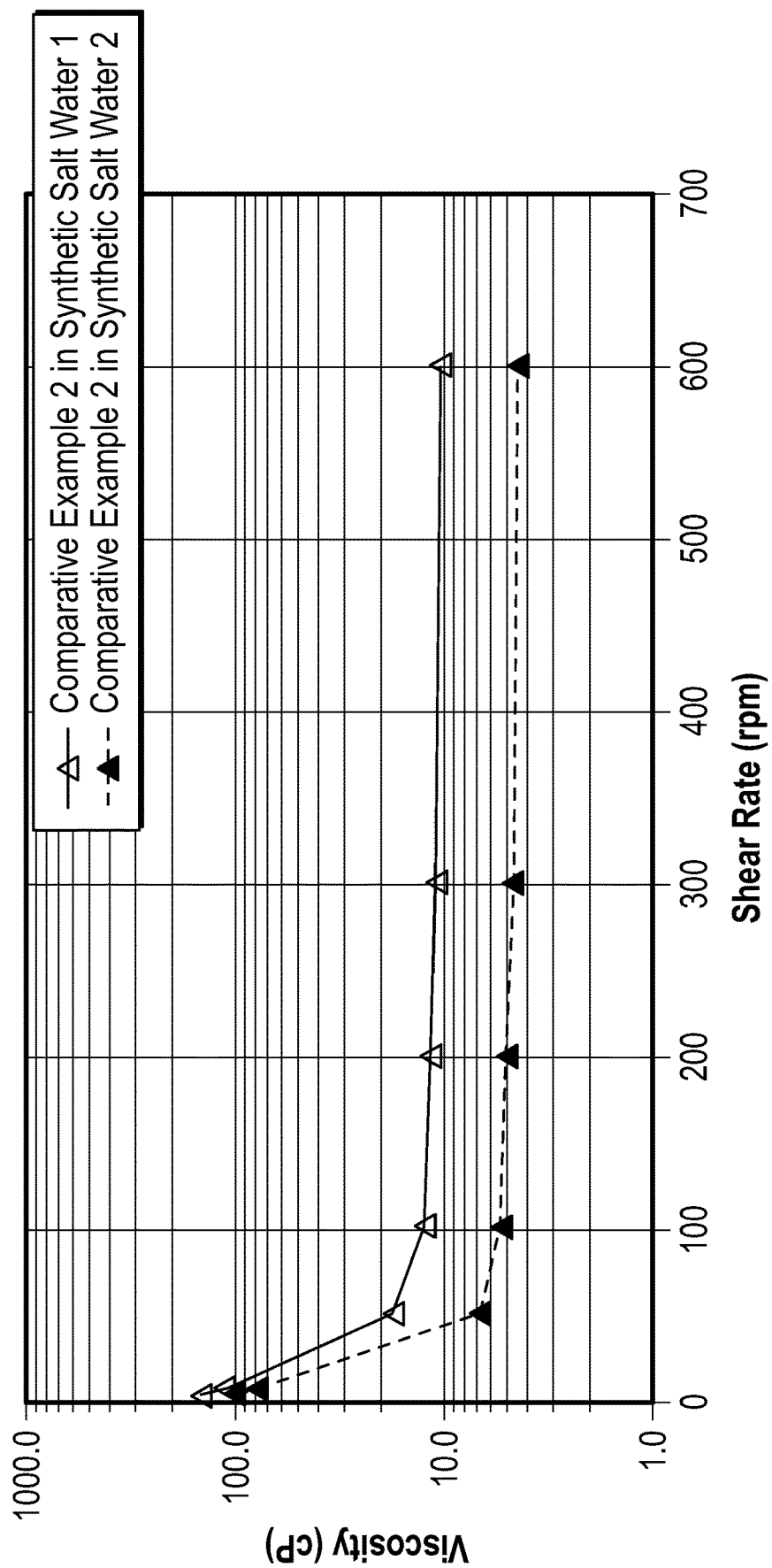
FIG. 2B shows a graph of viscosity versus shear rate for Comparative Example 2 in synthetic versions of natural salt water.

To confirm that the functional monomer with pendant carbohydrate group has an effect on the salt tolerance of Example 1, viscosity of Comparative Examples 1 and 2 (containing no carbohydrate groups) was tested in both Synthetic Salt Water 1 and Synthetic Salt Water 2 at a concentration of 5 gpt in emulsion form (active polymer loading level of 0.2 wt %). Results are summarized in Table 2 and FIGS. 2A and 2B. FIG. 2A shows a graph of viscosity versus shear rate for Comparative Example 1 in synthetic versions of natural salt water. FIG. 2B shows a graph of viscosity versus shear rate for Comparative Example 2 in synthetic versions of natural salt water. As shown in FIGS. 2A and 2B, a reduction of solution viscosity was observed for both CE1 and CE2 when the base fluid was changed from Synthetic Salt Water 1 to Synthetic Salt Water 2. For instance, the solution viscosity for Comparative Example 1 (FIG. 2A) at 300 rpm decreased from 7.8 cP in Synthetic Salt Water 1 to 2.8 cP in Synthetic Salt Water 2. Similarly, for Comparative Example 2 (FIG. 2B), the solution viscosity at 300 rpm was reduced from 10.9 cP in Synthetic Salt Water 1 to 4.6 cP in Synthetic Salt Water 2. In CE1 and CE2 at 300 rpm and 0.2 wt % loading, the viscosity is about 58% to about 65% less in high salinity Synthetic Salt Water 2 versus the viscosity in low salinity Synthetic Salt Water 1. These results confirm that acrylamide-based polymers without a monomer containing the pendant carbohydrate group lose viscosity as the salinity increases.

TABLE 1A

Viscosity data of Example 1 in Synthetic Salt Water 1.

| | Example 1-Viscosity (cP) | | | | |
|---|---|---|---|---|---|
| | Synthetic Salt Water 1 | | | | |
| Shear speed (rpm) | 1 wt % | 0.50 wt % | 0.30 wt % | 0.20 wt % | 0.10 wt % |
| 6 | 227.4 | 103.9 | 102.7 | 90.3 | 68.5 |
| 50 | 71.8 | 35.8 | 14.1 | 5.4 | 3.6 |
| 100 | 50.4 | 25.8 | 9.9 | 3.9 | 2.5 |
| 200 | 38.5 | 18.0 | 9.1 | 5.9 | 3.3 |
| 300 | 34.6 | 16.6 | 8.3 | 5.3 | 2.6 |
| 600 | 28.9 | 14.5 | 6.9 | 5.2 | 2.9 |

TABLE 1B

Viscosity data of Example 1 in Synthetic Salt Water 2.

| | Example 1-Viscosity (cP) | | | | |
|---|---|---|---|---|---|
| | Synthetic Salt Water 2 | | | | |
| Shear speed (rpm) | 1 wt % | 0.50 wt % | 0.30 wt % | 0.20 wt % | 0.10 wt % |
| 6 | 208.4 | 154.4 | 100.3 | 99.1 | 89.3 |
| 50 | 64.9 | 26.8 | 11.2 | 6.0 | 3.0 |
| 100 | 49.5 | 20.6 | 10.6 | 5.4 | 1.6 |
| 200 | 39.2 | 16.3 | 7.9 | 5.9 | 2.6 |
| 300 | 36.7 | 15.5 | 8.0 | 5.5 | 3.4 |
| 600 | 31.0 | 13.6 | 7.6 | 4.5 | 3.2 |

TABLE 2

Viscosity data comparison of Comparative Example 1 and 2.

| | Comparative Example 1 | | Comparative Example 2 | |
|---|---|---|---|---|
| Shear speed (rpm) | Salt water 1 | Salt water 2 | Salt water 1 | Salt water 2 |
| 6 | 100.8 | 83.0 | 113.7 | 80.7 |
| 50 | 14.1 | 1.9 | 17.6 | 6.8 |
| 100 | 11.5 | 2.4 | 12.3 | 5.4 |
| 200 | 8.2 | 3.0 | 11.5 | 5.0 |
| 300 | 7.8 | 2.8 | 10.9 | 4.6 |
| 600 | 7.0 | 3.0 | 10.5 | 4.4 |

Friction Reduction Performance

Figure 3:
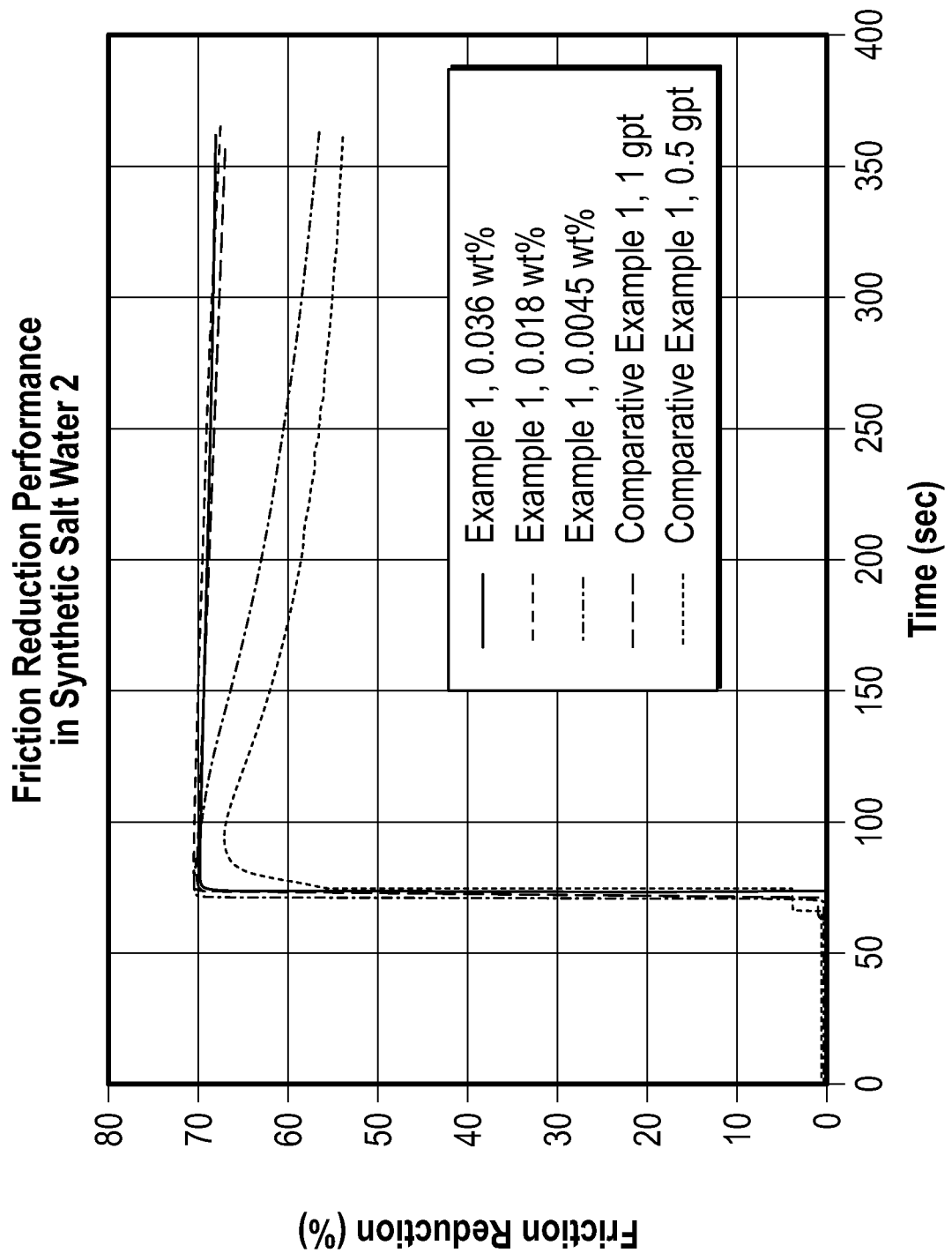
FIG. 3 shows a graph of friction reduction performance for Example 1 and Comparative Example 1 in synthetic salt water in accordance with one or more embodiments.

Friction reduction performance of the water-soluble anionic terpolymer from Example 1 was tested using a Mini-Loop™ (as previously described) and compared with the friction reduction performance of CE1. FIG. 3 shows a graph of friction reduction performance for Example 1 and Comparative Example 1 in synthetic salt water in accordance with one or more embodiments. FIG. 3 shows results of the friction reduction performance in Synthetic Salt Water 2.

Example 1 showed a friction reduction reaching 65 to 70% in Synthetic Salt Water 2 at a loading level as low as 0.018 wt %. The friction reduction dropped to around 57% when the Example 1 polymer loading was reduced to 0.0045 wt %.

The friction reduction performance of CE1 at a comparable loading level was tested. Specific parameters included 1 and 0.5 gpt in Synthetic Salt Water 2, corresponding to active polymer concentrations of about 0.04 wt % and 0.02 wt %, respectively. As shown in FIG. 3, friction reduction dropped to less than 55% at a friction reducer loading level of 0.5 gpt (active polymer loading level of about 0.02 wt %).

Compared to acrylamide polymer friction reducers without a functional monomer with a pendant carbohydrate moiety, the one or more embodiments of the disclosed water-soluble polymers provide advantageously improved salt tolerance in slickwater fracturing fluid compositions. Embodiments of the disclosed water-soluble polymers provide a well-maintained viscosity in the TDS concentration range of from about 4,000 mg/L to about 57,000 mg/L, such as from 4,000 mg/L to 50,000 mg/L, versus the comparative acrylamide polymer friction reducers without the functional monomer with a pendant carbohydrate moiety. In addition to the aforementioned advantageous effects, embodiments disclosed provide friction reduction performance in saltwater of 65% or greater.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function and not only structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed is:

1. An aqueous solution comprising:
   a water-soluble anionic terpolymer that is a reaction product of a first monomer that has a vinyl-containing group that is an acryloyl group linked to a pendant carbohydrate moiety, a second monomer that has a vinyl group, a carbonyl group and a nitrogen, and an anionic monomer,
   where the first monomer is glucose acrylate, the second monomer is acrylamide, and the anionic monomer is acrylic acid, and
   where the aqueous solution has a salinity in a range of from about 4,000 mg/L to about 57,000 mg/L total dissolved solids.

2. A method of use comprising:
   introducing an aqueous solution into a formation such that the formation fractures, where the aqueous solution comprises a water-soluble anionic terpolymer that is a reaction product of a first monomer that has a vinyl-containing group that is an acryloyl group linked to a pendant carbohydrate moiety, a second monomer that has a vinyl group, a carbonyl group and a nitrogen, and an anionic monomer, and where the aqueous solution has a salinity in a range of from about 4,000 mg/L to about 57,000 mg/L total dissolved solids,
   wherein the first monomer is glucose acrylate, the second monomer is acrylamide, and the anionic monomer is acrylic acid.

* * * * *